(12) United States Patent
Stabrey

(10) Patent No.: US 9,604,610 B2
(45) Date of Patent: Mar. 28, 2017

(54) METHOD FOR SETTING A LIMITING VALUE OF A VEHICLE STATE VARIABLE IN THE EVENT OF AN ACCIDENT

(75) Inventor: Stephan Stabrey, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 802 days.

(21) Appl. No.: 13/500,049

(22) PCT Filed: Sep. 7, 2010

(86) PCT No.: PCT/EP2010/063107
§ 371 (c)(1),
(2), (4) Date: Jun. 28, 2012

(87) PCT Pub. No.: WO2011/054563
PCT Pub. Date: May 12, 2011

(65) Prior Publication Data
US 2012/0265408 A1 Oct. 18, 2012

(30) Foreign Application Priority Data
Nov. 3, 2009 (DE) .......... 10 2009 046 337

(51) Int. Cl.
*B60W 50/12* (2012.01)
*B60T 8/1755* (2006.01)
*B60W 40/11* (2012.01)
*B60W 40/112* (2012.01)
(Continued)

(52) U.S. Cl.
CPC ......... *B60T 8/17551* (2013.01); *B60W 40/11* (2013.01); *B60W 40/112* (2013.01); *B60W 40/114* (2013.01); *B60T 2201/024* (2013.01); *B60W 2030/082* (2013.01)

(58) Field of Classification Search
USPC ....................................... 701/46, 45
See application file for complete search history.

(56) References Cited

U.S. PATENT DOCUMENTS 4,773,012 A * 9/1988 Ito .................. B62D 7/159
180/422
2002/0147532 A1* 10/2002 Inagaki ............. B60G 17/0195
701/41
(Continued)

FOREIGN PATENT DOCUMENTS

DE 4436162 3/1996
DE 102005016009 10/2006
(Continued)

OTHER PUBLICATIONS

International Search Report, PCT International Application No. PCT/EP2010/063107, dated Dec. 16, 2010.

*Primary Examiner* — John R Olszewski
*Assistant Examiner* — Jess Whittington
(74) *Attorney, Agent, or Firm* — Gerard Messina

(57) ABSTRACT

In a method for setting a limiting value of a vehicle state variable in a driver assistance system, in particular in an electronic stability program ESP, accelerations are measured by the airbag sensor system, and are used in the event of an accident of low to medium severity to determine limiting values of the yaw acceleration and the yaw rate. These limiting values are used for monitoring the functionality of the yaw rate sensor.

14 Claims, 1 Drawing Sheet

(51) Int. Cl.
*B60W 40/114* (2012.01)
*B60W 30/08* (2012.01)

(56) References Cited

U.S. PATENT DOCUMENTS

| | | | |
|---|---|---|---|
| 2004/0030477 A1* | 2/2004 | Gerdes | B60G 17/0185 701/48 |
| 2006/0064218 A1* | 3/2006 | Subbian | B60R 21/0132 701/45 |
| 2006/0273657 A1* | 12/2006 | Wanke | B60T 8/17555 303/146 |
| 2007/0017727 A1* | 1/2007 | Messih | B60G 17/016 180/282 |
| 2007/0162212 A1* | 7/2007 | Pengov | B60T 8/17551 701/69 |
| 2009/0132112 A1* | 5/2009 | Ewerhart | B60T 8/17558 701/29.2 |
| 2010/0004815 A1 | 1/2010 | Ewerhart et al. | |

FOREIGN PATENT DOCUMENTS

| | | |
|---|---|---|
| EP | 1215097 | 6/2002 |
| EP | 1642793 | 4/2006 |
| WO | WO 2006106025 | 10/2006 |

* cited by examiner

METHOD FOR SETTING A LIMITING VALUE OF A VEHICLE STATE VARIABLE IN THE EVENT OF AN ACCIDENT

FIELD OF THE INVENTION

The present invention relates to a method for setting a limiting value of a vehicle state variable in a driver assistance system in a vehicle in the event of an accident.

BACKGROUND INFORMATION

German Patent Application No. DE 10 2005 016 009 A1 describes a method for stabilizing a vehicle after a collision, in which the driving state of the vehicle is monitored with regard to the occurrence of a collision, a setpoint value for a vehicle movement variable is calculated independently of the driver's steering intent, and the vehicle movement variable is adjusted to this setpoint value in the event of a collision. To be able to carry out the stabilizing intervention regardless of the driver's steering intent, the method is applicable to vehicles having an active steering, in which an additional steering angle may be superimposed on the steering angle selected by the driver. The effect of a shock response on the part of the driver in the event of a collision of the vehicle may be reduced in this way, thereby achieving a more rapid and more effective stabilization.

The method described in German Patent Application No. DE 10 2005 016 009 A1 makes it possible to carry out a stabilizing intervention also in the event of a collision via a driver assistance system in the vehicle, in particular on the basis of the yaw rate measured with the aid of a corresponding sensor. Since such interventions (e.g., wheel-individual brake interventions of an electronic stability program ESP) may have extensive effects on the movement of the vehicle, it is necessary to ensure that the measured variables on which the calculation is based are correct. This is ensured by monitoring the sensor signals. For example, a check is performed by simple monitoring to ascertain whether the signal of the sensor is within physically plausible limits. If this is not the case, then the driver assistance system is necessarily switched to a mode of a lower functionality, for example, for which the monitored sensor signal is not needed.

International Patent Application No. WO 2006/106025 A1 describes that sensor signals which are processed in a driver assistance system may be subjected to a plausibility check in borderline situations pertaining to driving dynamics. The signal plausibility range is enlarged in the event of a collision to keep the corresponding vehicle system fully functional. At least one plausibility criterion, for example, a predefined limiting value for an absolute value, is modified here, thus ensuring that the function of the higher-level system is also preserved in borderline situations.

SUMMARY

In accordance with example embodiments of the present invention, the functionality of a driver assistance system in a vehicle is preserved in the event of an accident as much as possible.

An example method according to the present invention is used to set a limiting value for monitoring sensor signals in a driver assistance system in a vehicle in the event of an accident. The background is to preserve the greatest possible functionality of the driver assistance system.

To detect an accident, a parameter characterizing the accident severity is checked for whether an assigned threshold value has been exceeded. If the threshold value has been exceeded, it is possible to assume an accident having a certain accident severity, whereupon the limiting value of the vehicle state variable in question is modified according to the present invention. If necessary, the existence of an accident may also be signaled by an airbag system. The limiting value and the threshold value of the vehicle state variable is ascertained as a function of the situation in this way and, thus, does not constitute a fixed variable, so it is possible to respond to the existing accident situation in a flexible manner, and the functionality of the driver assistance system in particular may be retained as a function of the accident severity. Interventions carried out autonomously by the driver assistance system are thus possible over a larger operating range and may in particular also be carried out even in accidents, thus contributing to a reduction in the consequences of an accident.

The change in the limiting value of the vehicle state variable is preferably carried out on the basis of data ascertained by sensors, the data being recorded at the moment of the accident, so that the accident severity is directly or indirectly incorporated in the determination of the limiting value. It is advantageous here that the parameter characterizing the accident severity is ascertained as a measured variable, and the limiting value of the vehicle state variable in question is determined as a function of the measured variable. The parameter or the measured variable, for example, is at least an acceleration value, which is ascertained via the airbag sensor system in the vehicle, for example. The accident severity may be inferred from these acceleration values ascertained by sensors, and at the same time, the accelerations are used to define the limiting value of the vehicle state variable. The limiting value of the vehicle state variable is determined as a function of at least one acceleration value, both a linear dependence of the limiting value and a nonlinear dependence being considered. Acceleration values of different driving state variables are fundamentally considered, in particular the vehicle longitudinal acceleration and/or the vehicle transverse acceleration but also the yaw acceleration, for example.

In taking into account the acceleration sensors of the airbag system or some other sensor system in the vehicle, the longitudinal and transverse forces acting on the vehicle may be estimated from the longitudinal and transverse accelerations, taking into account the mass of the vehicle. The longitudinal and transverse forces may be used to determine a maximum yaw moment about the vertical axis of the vehicle, the maximum lever arms also being taken into account, these lever arms being determined under the assumption of a center of gravity of the vehicle at the geometric center of the vehicle from half the width of the vehicle and half the length of the vehicle. If the maximum yaw moment is known, a yaw acceleration limiting value, which is physically plausible under the given external forces and is thus determined from the longitudinal and transverse accelerations at the time of the accident, may be determined from the principle of angular momentum, taking into account the moment of inertia of the vehicle about the vertical axis.

Limiting values of other vehicle state variables, which may be determined from sensor data ascertained instantaneously at the time of the accident, may essentially also be modified. Additionally, it is possible to make the yaw acceleration limiting value described above the basis for additional ascertainments, in particular for determining a yaw rate limiting value by integrating the yaw acceleration limiting value.

A multistage sensor monitoring may be carried out using the example method according to the present invention. If the parameter characterizing the accident severity is below the assigned threshold value, there is no accident; in this case the limiting values of the vehicle state variable in question are set to initial values. The functionality of the sensor system, in particular of the yaw rate sensor, is then monitored via methods known from the related art, inter alia by comparison with these constant limiting values.

If the parameter characterizing the accident severity indicates an accident of a low to moderate severity but which is still below an upper threshold value, which indicates mechanical load limits of the sensor system, in the example method according to the present invention, the limiting value of the vehicle state variable in question is ascertained as a function of other state variables at the moment of the accident. In particular, a yaw acceleration limiting value and/or a yaw rate limiting value is/are determined from the vehicle longitudinal acceleration and the vehicle transverse acceleration at the time of the accident.

If there has been an accident of great severity, which is the case when the parameter in question exceeds an assigned upper threshold value, then it must be assumed that the accelerations are outside of the mechanical acceleration limits for the sensor system, in particular the yaw rate sensor, so that there is a high probability that at least one sensor is defective. In this case, the driver assistance system may be reparameterized, i.e., switched in particular to a reduced functionality, for which the signals of the sensor, which is probably defective, are not needed. Since in very severe accidents the damage to the vehicle is usually so great that a targeted influence on the vehicle movement is hardly possible anyway, the reduced functionality of the ESP or any other intervention of a driver assistance system is hardly of any consequence. In such situations, for example, all four wheels of the vehicle could be braked automatically to bring it to a standstill as rapidly as possible. This is also possible with a defective yaw rate sensor.

Inasmuch as a vehicle acceleration, for example, the longitudinal acceleration of the vehicle and/or the transverse acceleration of the vehicle is taken into account as the parameter characterizing the accident severity, this acceleration to be ascertained via the airbag sensor system or via another vehicle sensor system, for example, then this parameter is preferably used at the same time as the basis for ascertaining the limiting value of the vehicle state variable in question, which is in particular the yaw acceleration or the yaw rate. This procedure has the advantage that a decision about the accident severity may be made solely on the basis of the measured accelerations, and a limiting value adjustment of the vehicle state variable of interest may also be carried out solely on that basis.

Additional advantages and advantageous embodiments may be derived from the description below and from the FIGURE.

DETAILED DESCRIPTION OF EXAMPLE EMBODIMENTS

Figure 1:
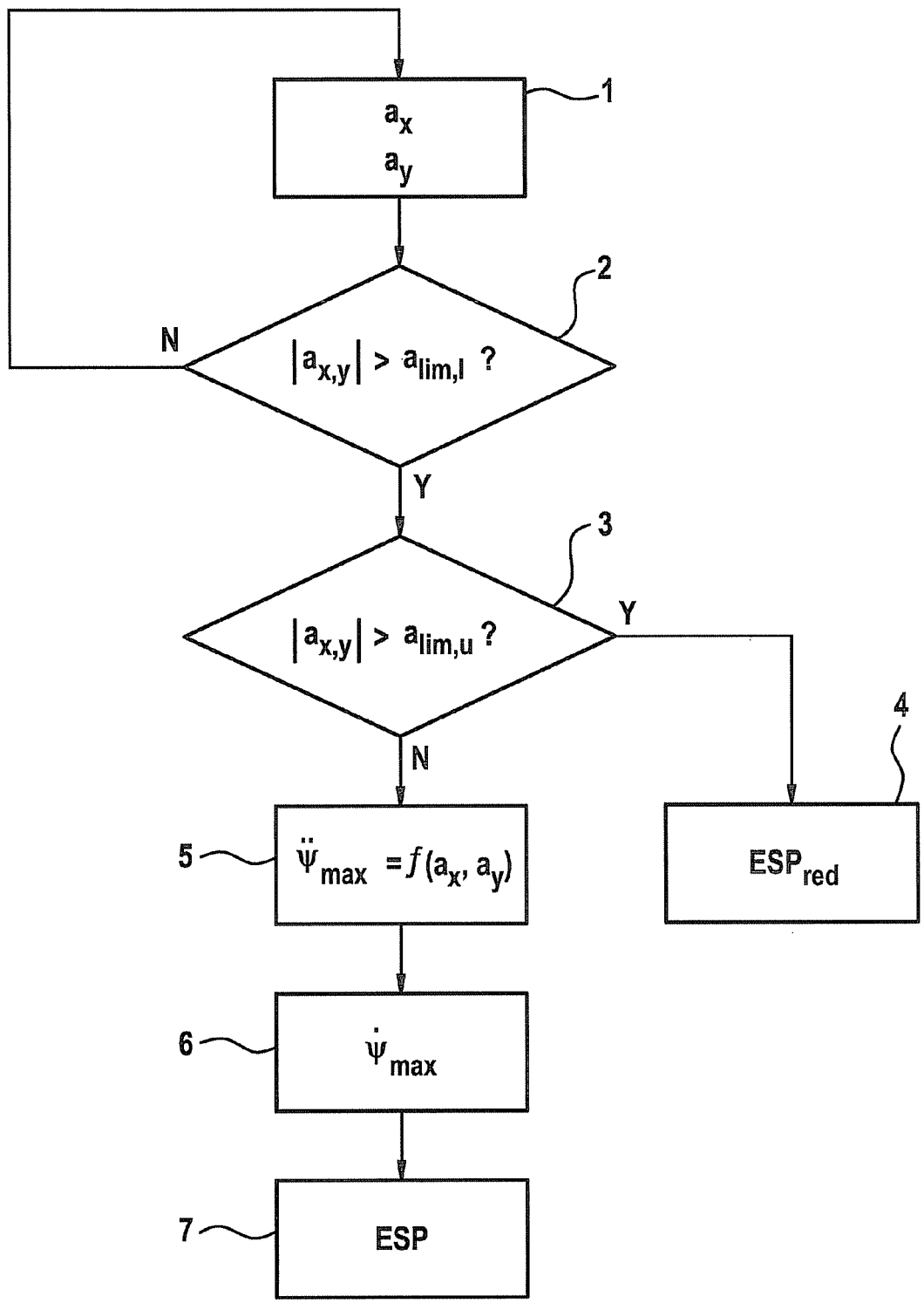
FIG. 1 shows a flow chart for implementing an example method for setting a limiting value in the event of an accident.

The flow chart shown in the FIGURE relates to setting a limiting value of a vehicle state variable in a vehicle in the event of an accident of low to moderate severity. This method is executed in a regulating and control unit in the vehicle, which is part of the driver assistance system in particular, preferably an electronic stability program ESP. On the basis of data ascertained by sensors, control interventions are carried out in actuators via the driver assistance system, with the goal of influencing the driving dynamics of the vehicle. For example, brake interventions are carried out via the electronic stability program ESP to stabilize the vehicle. Under the prerequisites described below, such interventions via a driver assistance system may also be carried out after an accident has occurred.

According to method step 1, vehicle longitudinal acceleration $a_x$ and vehicle transverse acceleration $a_y$ are initially measured via an on-board sensor system, in particular via the airbag sensor system. In method steps 2 and 3 which follow, there is a query of whether particular acceleration values $a_x$, $a_y$ are inside or outside ranges, which are defined by a lower threshold value $a_{lim,l}$ and an upper threshold value $a_{lim,u}$, a lower threshold value and an upper threshold value being assigned to longitudinal acceleration $a_x$ and transverse acceleration $a_y$, respectively.

In method step 2, the query initially takes place of whether accelerations $a_x$ and $a_y$ exceed by an absolute amount lower threshold value $a_{lim,l}$ assigned to each of them. If this is not the case, then following the "no" branch ("N"), the method returns to the start according to method step 1. In this case, the measured accelerations are in a low value range and thus there is no accident and the sensor signal monitoring may be carried out in the ESP using constant limiting values, as is customary in the related art.

However, if the query according to method step 2 reveals that the measured accelerations exceed lower threshold value then an accident, for example, a collision, must be assumed. In this case—or when the airbag system has signaled the existence of a collision—the "yes" branch ("Y") is followed to proceed to next method step 3, in which a further check is performed to ascertain whether acceleration values $a_x$ and $a_y$ each have exceeded an assigned upper threshold value $a_{lim,u}$. This additional query should clarify whether this is an accident of low severity or moderate severity or an accident of high severity, which results in different consequences in the sequence of the method.

If the query according to method step 3 reveals that upper threshold value $a_{lim,u}$ is exceeded, then this is an accident of great severity. In this case, the "yes" branch is followed to method step 4, in which the electronic stability program ESP is reparameterized at a reduced functionality ($ESP_{red}$). In an accident of great severity, it must therefore be assumed that the mechanical load limits resulting from the accident, in particular of a yaw rate sensor in the vehicle, are exceeded and therefore the yaw rate sensor might be defective. The functionality of the ESP system may be modified by reparameterization in such a way that the sensor data of the yaw rate sensor are not used, e.g., by automatically decelerating the vehicle. Based on the great accident severity, it is to be assumed that the damage to the vehicle is usually so great that a reduced functionality of the ESP does not play a very great role.

However, if the query in method step 3 reveals that measured longitudinal acceleration $a_x$ and transverse acceleration $a_y$ do not exceed upper threshold value $a_{lim,u}$, then this is an accident, i.e., a collision, of low to moderate severity. In this case, the "no" branch is followed to method step 5, in which a yaw acceleration limiting value $\overline{\Psi}_{max}$ is ascertained in a general manner according to the relationship:

$$\overline{\Psi}_{max} = f(a_x, a_y)$$

on the basis of acceleration values $a_x$ and $a_y$ ascertained during the accident. Yaw acceleration limiting value $\overline{\Psi}_{max}$ depends on the maximum yaw moment $M_{z,max}$ acting about the vertical axis of the vehicle according to $$\overline{\Psi}_{max} = \frac{M_{z,max}}{J}$$

and depends on moment of inertia J of the vehicle about the vertical axis of the vehicle. Maximum yaw moment $M_{z,max}$ is determined according to $$M_{z,max} = \left| F_x \cdot \frac{b}{2} \right| + \left| F_y \cdot \frac{l}{2} \right|$$

from the amount of the individual moments acting about the vertical axis, resulting from instantaneous forces $F_x$ in the vehicle longitudinal direction and $F_y$ in the vehicle transverse direction under the assumption that the center of gravity of the vehicle is at the geometric center of the vehicle and maximum lever arms b/2 and l/2 are in effect, with b denoting the width of the vehicle and l denoting the length of the vehicle.

Longitudinal force $F_x$ and transverse force $F_y$ are determined from longitudinal acceleration $a_x$ and transverse acceleration $a_y$, ascertained by sensors, and vehicle mass m:
$F_x = m \cdot a_x$
$F_y = m \cdot a_y$ It is sufficient to know the instantaneous longitudinal and transverse acceleration at the time of the accident and the additional geometric data for the vehicle as well as the mass and the moment of inertia in order to ascertain limiting values for the yaw acceleration, which may be used in driver assistance system ESP, even after the occurrence of an accident.

By integrating yaw acceleration limiting value $\overline{\Psi}_{max}$ according to $$\dot{\Psi}_{max} = \int \overline{\Psi}_{max}$$

in method step 6, a yaw rate limiting value $\dot{\Psi}_{max}$ is ascertained. Limiting values $\dot{\Psi}_{max}$, $\overline{\Psi}_{max}$ are sent to electronic stability program ESP in method step 7, which follows and in which the signal of the yaw rate sensor supplied after the occurrence of the accident is also monitored for whether the corresponding limiting values are exceeded. As long as the limiting values are not exceeded, the functionality of the ESP system, which is based on measured yaw rate values, may thus be utilized.

What is claimed is:

1. A method for setting a limiting value of a vehicle state variable in a driver assistance system in a vehicle in the event of an accident, the method comprising: modifying, by a processor, the limiting value of the vehicle state variable for the case when a parameter characterizing a severity of the accident exceeds an assigned first threshold value, wherein the limiting value of the vehicle state variable is modified as a function of acceleration values from an airbag sensor which occur during the accident, and wherein the modifying of the limiting value of the vehicle state variable is carried out only if the parameter characterizing the severity of the accident does not exceed a specified second threshold value which is greater than the first threshold value; and controlling an operation of an electronic stability program system in accordance with the limiting value.

2. The method as recited in claim 1, wherein the limiting value of the vehicle state variable is a linear function of the acceleration values.

3. The method as recited in claim 1, wherein the limiting value of the vehicle state variable is modified based on data ascertained by sensors at a moment of the accident.

4. The method as recited in claim 1, wherein the acceleration values in at least one of a longitudinal direction of the vehicle and a transverse direction of the vehicle are taken into account in the modifying of the limiting value of the vehicle state variable.

5. The method as recited in claim 4, wherein a force is ascertained from the instantaneous longitudinal acceleration and the instantaneous transverse acceleration.

6. The method as recited in claim 5, wherein the ascertained force is converted into a maximum moment.

7. The method as recited in claim 1, wherein at least one of a yaw acceleration limiting value and a yaw rate limiting value is modified.

8. The method as recited in claim 7, wherein the yaw acceleration limiting value is ascertained from a maximum moment about a vertical axis of the vehicle.

9. The method as recited in claim 8, wherein the yaw rate limiting value is ascertained by integration of the yaw acceleration limiting value.

10. The method as recited in claim 1, wherein the vehicle state variable is not utilized if the second threshold value is exceeded.

11. The method as recited in claim 1, wherein the limiting value of the vehicle state variable is utilized only to a limited extent if the second threshold value is exceeded.

12. The method as recited in claim 1, wherein the parameter characterizing the severity of the accident is a vehicle acceleration.

13. A regulating and control unit including a processor to set a limiting value of a vehicle state variable in a drive assistance system in a vehicle in the event of an accident, the regulating and control unit configured to modify the limiting value of the vehicle state variable for the case when a parameter characterizing a severity of the accident exceeds an assigned first threshold value, wherein the limiting value of the vehicle state variable is modified as a function of acceleration values from an airbag sensor which occur during the accident, and wherein the modifying of the limiting value of the vehicle state variable is carried out only if the parameter characterizing the severity of the accident does not exceed a specified second threshold value which is greater than the first threshold value, wherein an operation of an electronic stability program system is controlled in accordance with the limiting value.

14. An electronic stability program system including a processor in a vehicle, comprising: a regulating and control unit to set a limiting value of a vehicle state variable in a drive assistance system in a vehicle in the event of an accident, the regulating and control unit configured to modify the limiting value of the vehicle state variable for the case when a parameter characterizing a severity of the accident exceeds an assigned first threshold value, wherein the limiting value of the vehicle state variable is modified as a function of acceleration values from an airbag sensor which occur during the accident, and wherein the modifying of the limiting value of the vehicle state variable is carried out only if the parameter characterizing the severity of the accident does not exceed a specified second threshold value which is greater than the first threshold value, wherein an operation of the electronic stability program system is controlled in accordance with the limiting value.

* * * * *